United States Patent
Graf et al.

(10) Patent No.: US 7,143,977 B2
(45) Date of Patent: Dec. 5, 2006

(54) FORCE SUPPORTING MODULE FOR PROVIDING A LOAD-DEPENDENT SUPPORTING FORCE

(75) Inventors: Oleg Graf, Burgrieden (DE); Ralf Poberschnigg, Zimdorf (DE)

(73) Assignee: Aircabin GmbH, Laupheim (DE)

( * ) Notice: Subject to any disclaimer, the term of this patent is extended or adjusted under 35 U.S.C. 154(b) by 18 days.

(21) Appl. No.: 10/514,404

(22) PCT Filed: May 19, 2003

(86) PCT No.: PCT/EP03/05255

§ 371 (c)(1),
(2), (4) Date: Nov. 15, 2004

(87) PCT Pub. No.: WO03/097457

PCT Pub. Date: Nov. 27, 2003

(65) Prior Publication Data

US 2005/0218264 A1   Oct. 6, 2005

(30) Foreign Application Priority Data

May 17, 2002  (DE) .............................. 102 22 125

(51) Int. Cl.
*B64D 11/00* (2006.01)
(52) U.S. Cl. .................. 244/118.1; 244/118.5
(58) Field of Classification Search ............. 244/118.1, 244/118.5, 129.1; 312/245–248
See application file for complete search history.

(56) References Cited

U.S. PATENT DOCUMENTS

| | | | | |
|---|---|---|---|---|
| 5,244,269 A | * | 9/1993 | Harriehausen et al. ...... | 312/247 |
| 5,383,628 A | * | 1/1995 | Harriehausen et al. ... | 244/118.1 |
| 5,441,218 A | * | 8/1995 | Mueller et al. .......... | 244/118.1 |
| 5,839,694 A | * | 11/1998 | Bargull et al. .......... | 244/118.1 |
| 6,045,204 A | * | 4/2000 | Frazier et al. ............. | 312/247 |
| 6,357,842 B1 | | 3/2002 | Nott et al. | |
| 6,691,951 B1 | * | 2/2004 | Frazier .................... | 244/118.1 |
| 2004/0245897 A1 | * | 12/2004 | Stephan et al. ............. | 312/246 |

FOREIGN PATENT DOCUMENTS

DE         4130644 C2     3/1993

(Continued)

*Primary Examiner*—Galen Barefoot
(74) *Attorney, Agent, or Firm*—Wood, Herron & Evans, LLP (57) ABSTRACT

The invention relates to a force assistance module (10) for providing a load-dependent assistance force, in particular for a lowerable overhead luggage compartment in an aircraft, comprising a housing (18), a spring system for generating the assistance force, of which spring system one end is coupled pivotally about an axis (Z) in the housing (18) and the other, opposite end defines a force application point (P), a force-transmitting device fastened to or in the vicinity of the force application point (P) for transmitting assistance force to a location remote from the force assistance module, a support (36), which is mounted rotatably in the housing (18) and on which a path (40) is provided, along which the force application point (P) is displaceable back and forth between a first end point (A) and a second end point (B), and an adjusting device (52), which interacts with the support (36) and a load sensor and which as a function of the load detected by the load sensor rotates the support (36) in order to vary the angle between the force application direction of the assistance force at the force application point (P) and the force-transmitting device and hence adapt the value of the assistance force acting upon the force-transmitting device to the detected load.

23 Claims, 6 Drawing Sheets

FOREIGN PATENT DOCUMENTS

| | | |
|---|---|---|
| DE | G 93 05 133.6 | 7/1993 |
| DE | 4335151 C2 | 4/1995 |
| DE | 4446772 C1 | 5/1996 |
| DE | 19617657 A1 | 11/1997 |
| DE | 10001038 A1 | 9/2001 |
| DE | 1260434 A1 | 11/2002 |

* cited by examiner

FORCE SUPPORTING MODULE FOR PROVIDING A LOAD-DEPENDENT SUPPORTING FORCE

The invention relates to a force assistance module for providing a load-dependent assistance force. In particular, the invention relates to such a force assistance module for use in connection with a lowerable overhead luggage compartment in a passenger aircraft.

Lowerable overhead luggage compartments in aircraft are known. DE 41 30 644 C2, for example, describes a lowerable overhead luggage compartment of a passenger aircraft comprising guide systems in the form of four-bar mechanisms at each side wall of the luggage compartment and comprising a pneumatic pressure spring for each guide system, which spring in accordance with the weight of the luggage compartment supplies an assistance force for upward swiveling of the luggage compartment. An adjusting device during loading detects the weight of the luggage compartment and acts via an adjusting connection upon the force application point of the pneumatic pressure spring in order to achieve a setting corresponding to the respective loaded weight of the luggage compartment.

From DE 43 35 151 C2 a lowerable overhead luggage compartment is known, which likewise comprises at each of its two side walls a guide system with an associated pneumatic spring. The pneumatic spring is workingly connected to an assistance device, which for upward swiveling of the luggage compartment provides an assistance force adapted to the weight of the luggage compartment. A blocking device enables a latching of the assistance device.

Finally, DE 44 46 772 C1 describes an apparatus for guiding a lowerable overhead luggage compartment comprising two four-bar mechanisms disposed on the side walls of the luggage compartment as well as one spring system per four-bar mechanism for assisting the upward swivelling motion of the luggage compartment. A weighing plate disposed inside the luggage compartment acts upon pressure sensors, which are disposed below the weighing plate and are in turn connected by at least one adjusting connection to an adjusting cylinder, which acts upon an adjusting device for displacing the force application point of the spring system in order to displace the force application point as a function of the weight of the luggage compartment, thereby supplying an adapted opposing torque to the load moment resulting from the weight of the luggage compartment.

A basic requirement of a lowerable overhead luggage compartment is that the manual forces needed to open and close the luggage compartment, independently of the loaded state of the luggage compartment, remain at least approximately constant and have values that may still be summoned up easily even by a weaker person. The apparatuses for this purpose that are known from the background art are of a relatively complex construction and hence potentially susceptible to faults.

The underlying object of the invention is to indicate an improved apparatus which i.a. is capable, in connection with a lowerable overhead luggage compartment of an aircraft, of providing an assistance force dependent upon the loaded state of the luggage compartment.

This object is achieved according to the invention by a force assistance module having the features indicated in claim 1. The force assistance module according to the invention has a housing, in which a spring system for generating an assistance force is disposed, one end of which is coupled pivotally about an axis in the housing and the other, opposite end of which defines a force application point for the assistance force. A force-transmitting device is fastened to or in the vicinity of the force application point and may transmit the assistance force to a location remote from the force assistance module. Situated on a support mounted rotatably in the housing is a path, along which the force application point is displaceable back and forth between a first end point and a second end point. An adjusting device, which interacts with the rotatable support and a load sensor, rotates the support in dependence upon the load detected by the load sensor and hence varies the angle between the force application direction of the assistance force at the force application point and the force-transmitting device in order thereby to adapt the value of the assistance force acting upon the force-transmitting device to the detected load. In other words, the further the rotatable support is rotated out of a starting position, the smaller the angle becomes between the force application direction of the assistance force at the force application point and the force-transmitting device, so that the force vector acting in the direction of the force-transmitting device and hence the assistance force transmitted to the force-transmitting device becomes greater. Since the support is preferably infinitely rotatable, the assistance force acting upon the force-transmitting device is also infinitely adapted to the detected load.

The load sensor may be a mechanical sensor but is preferably an electrical sensor, e.g. a sensor operating on the strain gauge principle.

In preferred forms of construction of the force assistance module according to the invention, the spring system generating the assistance force is a pneumatic pressure spring. As a pneumatic pressure spring, it is possible to use a rigidly latchable pneumatic pressure spring, by means of which the force assistance module may be latched, i.e. locked, in any desired operating position. Such a rigidly latchable pneumatic pressure spring comprises an externally controllable valve, by means of which the hydraulic system of the pneumatic pressure spring may be shut off. A pneumatic pressure spring thus latched may withstand forces of up to 10,000 N without altering its travel position. Preferably, in this manner a closed position of the force assistance module may be securely locked.

According to an advantageous development of the force assistance module, a slide is connected to the force-releasing end of the spring system and is displaceable back and forth along the path provided by the support. The force-transmitting device is fastened to the slide. Preferably, the slide is designed in such a way that it may roll along the path. For this purpose, the slide may comprise e.g. one or more rollers. The slide makes it possible in an advantageous manner to bring the force application point of the assistance force and the fastening of the force-transmitting device close together. Preferably, the force application point of the assistance force and the fastening point of the force-transmitting device are situated on a common axis, which extends through the slide and cuts the force application direction of the assistance force at a right angle. The slide, which normally moves only when a user of the force assistance module moves the load connected to the force-transmitting device, may according to an embodiment also be moved in a motorized manner, i.e. displaced in a motorized manner along the path. With such an embodiment, a user of the force assistance module need not summon up any force at all when the load connected to the force-transmitting device is to be moved. Instead, the slide moves automatically along the path in dependence upon signals supplied to it, and/or to the motor driving it, by a controller. If the load connected to the force-transmitting device is, for example, a lowerable luggage compartment, a sensor or switch on the handle of the luggage compartment may detect an opening movement and cause the controller to move the slide along the path into the open position. Analogously, when a closing requirement is detected by a sensor, the controller may allow the slide to move along the path into the closed position.

Preferably, in all embodiments of the force assistance module according to the invention, the first end point on the path provided by the support corresponds to an open position and the second end point corresponds to a closed position. When the force assistance module according to the invention is used together with a lowerable overhead luggage compartment, the luggage compartment is accordingly situated in its lowered, open position when the force application point in the force assistance module is situated at the first end point. Analogously, the luggage compartment is situated in its closed position when the force application point in the force assistance module is situated at the second end point.

According to an advantageous embodiment, a rotating of the support in the force assistance module by means of the adjusting device is effected only when the force application point is situated at the first end point, i.e. a rotating of the support is effected only in a position corresponding to the open position of the force assistance module. This is based on the assumption that the loaded state of a luggage compartment may alter only in the open position. Naturally, in connection with a different application it is also possible to effect a rotating of the support at any point lying between the first and the second end point.

In a particularly preferred form of construction of the force assistance module according to the invention, the force application point of the assistance force, the first end point of the path and the pivot point of the support providing the path lie on a common axis. In an embodiment, in which a rotating of the support is effected only at the first end point, this means that a rotating of the support may be effected without compression or extension of the spring system. The rotating of the support therefore requires only a very low force and consequently only very little energy.

In one embodiment of the force assistance module according to the invention, the path provided by the rotatable support is a path in the shape of a sector of an annulus. In another embodiment, the shape of the path changes as a function of the rotating of the support.

Preferably the shape of the path, given no load or low loads, is the shape of a sector of an annulus and becomes progressively more rectilinear with increasing load. At maximum load, the path is then preferably a straight line.

When the shape of the path changes as a function of the rotating of the support, the path advantageously comprises a plurality of sections connected in an articulated manner to one another, and a control plate, which is displaceable relative to the support and connected to the sections, varies the position of the individual sections relative to one another as a function of the rotating of the support. In a preferred development, the control plate is positively guided on the support, e.g. by means of pins projecting from the support into corresponding gates of the control plate. The effect achieved by the positive guidance is that, upon a rotation of the support, the control plate is displaced relative to the support, so that the shape of the path alters in a desired manner. Given the embodiment described above, the control plate itself may form a section of the path.

In a preferred form of construction, the adjusting device of the force assistance module according to the invention comprises a spindle drive, which through rotation of its spindle rotates the support back and forth. The spindle is preferably driven by means of an electric motor, which in an advantageous development is a stepping motor. An electric motor and, in particular, a stepping motor is precisely and reproducibly controllable so that a defined load-dependent behaviour of the force assistance module is maintained over extended periods. Electric motors are moreover rugged and quick to respond and they are also ideally suitable for control by means of signals originating from an electrical sensor, optionally with the interposition of a suitable control unit. Since according to preferred forms of construction of the force assistance module the force needed to rotate the support is only low, it is accordingly possible to use small and hence lightweight electric motors. The force-transmitting device of the force assistance module according to the invention may be, for example, a linkage or a chain. According to a preferred constructional variant, however, the force-transmitting device is a cable. The force-transmitting device is fastened by its one end in the force assistance module to or in the vicinity of the force application point of the assistance force and by its other end to the article, upon which the assistance force is to act. Such an article may be, for example, a lowerable overhead luggage compartment of an aircraft.

In some forms of construction of the force assistance module according to the invention, the value of the assistance force acting on the force transmission device remains constant during a displacement of the force application point of the assistance force between the first end point and the second end point. It is thereby ensured that the actuating force, which an article connected to the force assistance module requires, remains constant throughout the movement from the closed position to the open position and vice versa. In alternative forms of construction, the value of the assistance force acting upon the force-transmitting device increases during a displacement of the force application point from the first end point to the second end point. The effect thereby achieved is that the actuating force needed to move an article connected to the force assistance module becomes progressively lower, the greater the proximity to the closed position. The tuning may be such that the value of the assistance force, which acts upon the force-transmitting device, shortly before attainment of the second end point corresponds to or slightly exceeds the detected load. The result of this is that the article connected to the force assistance module automatically adopts its closed position, i.e. a luggage compartment, for example, automatically closes after having been moved by a user to a point in the vicinity of the closed position.

It is self-evident that by suitably designing the spring system almost any desired assistance force may be achieved. This means that the actuating force needed to move an article connected to the force assistance module is in practice freely selectable by correspondingly defining the assistance force, which is transmitted by the force assistance module by means of the force-transmitting device to the article.

The housing of the force assistance module according to the invention preferably comprises two plates, which are held apart from one another and between which are disposed the spring system, the rotatable support and the adjusting device as the most important components of the module. In this manner, a module is obtained, which is of a flat construction and yet well protected and may be used at many installation sites.

The force assistance module according to the invention is eminently suitable for a lowerable overhead luggage compartment of an aircraft but is also suitable for many other applications, where a movement of an article from one end position into another end position is to be force-assisted.

A preferred embodiment of a force assistance module according to the invention is described in detail below with reference to the accompanying diagrammatic drawings. The drawings show.

Figure 1:
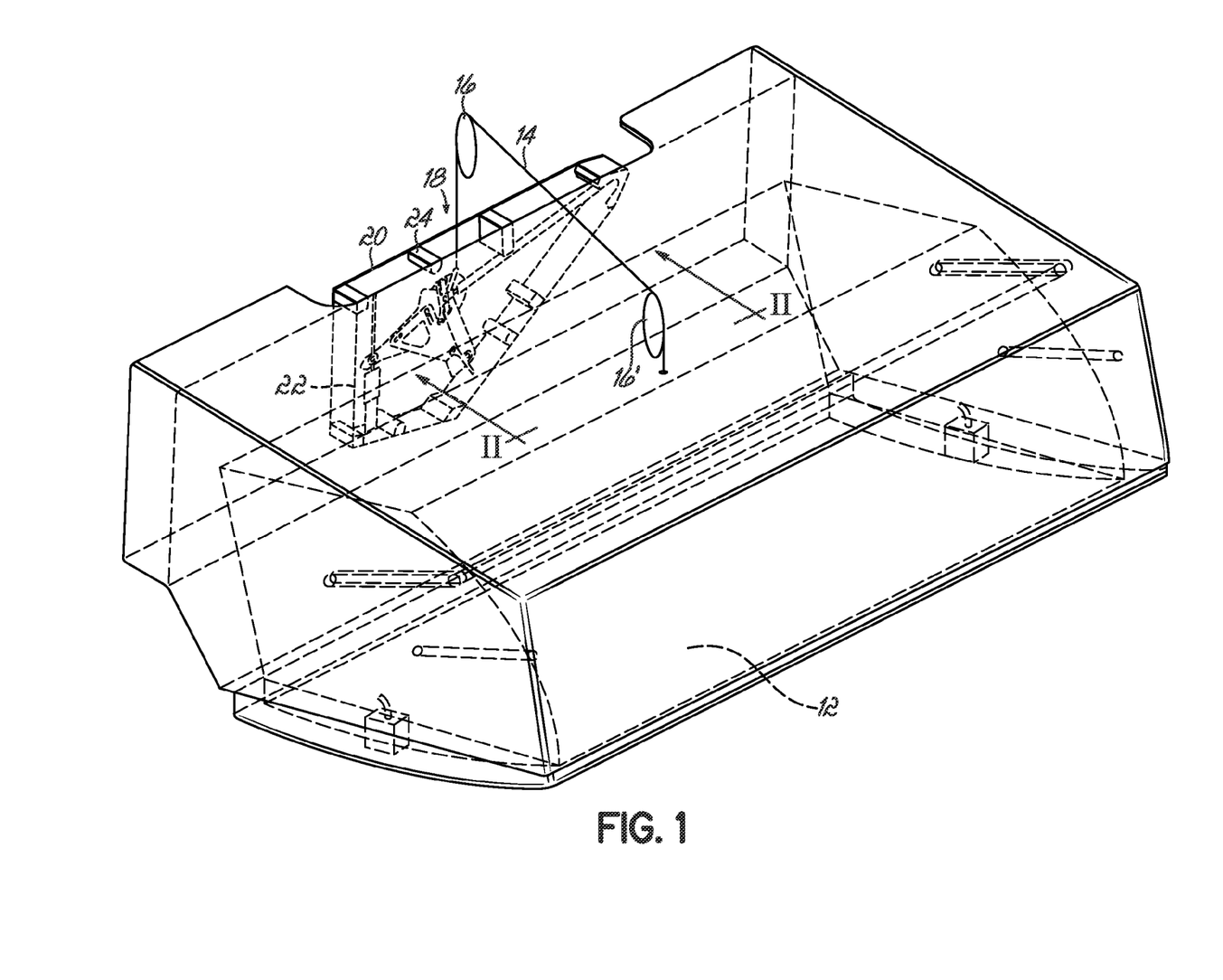
FIG. 1 a force assistance module according to the invention, which is mounted behind the back of an overhead luggage compartment of an aircraft and which by means of a force-transmitting device in the form of a cable transmits an assistance force to the overhead luggage compartment, FIG. 2 a plan view of the force assistance module in the open state of the housing, in a position corresponding to an unloaded and open state of the overhead luggage compartment, FIG. 3 the view according to FIG. 2, in a position corresponding to an unloaded and closed overhead luggage compartment, FIG. 4 the view according to FIG. 2, in a position corresponding to a fully loaded and open overhead luggage compartment, FIG. 5 the view according to FIG. 2, in a position corresponding to a fully loaded and closed overhead luggage compartment, FIG. 6 a plan view of a control plate of the force assistance module according to the invention, and FIG. 7 a side view of the control plate of FIG. 6.

For a better understanding, FIG. 1 shows a force assistance module, which is generally denoted by 10 and which is mounted behind the back of a housing of a lowerable overhead luggage compartment 12 of an aircraft, which is not illustrated further. The force assistance module 10 by means of a cable 14 serving as a force-transmitting device transmits an assistance force to the luggage compartment 12 in order to keep the force needed to open and close the luggage compartment 12 to a low level, irrespective of whether the luggage compartment 12 is empty or fully loaded. The cable 14 is fastened by its one end in the force assistance module 10 and by its other end to the luggage compartment 12 and extends via two guide pulleys 16, 16', which are merely indicated here.

The force assistance module 10 has a housing 18, which comprises two mutually parallel cover plates 20, 22, which are connected to spacers 24 (see FIG. 2) and held a defined distance apart from one another by said spacers. The cover plates 20, 22 may be of a closed construction or, as shown in FIG. 1, may be constructed with through-holes to save weight.

Figure 2:
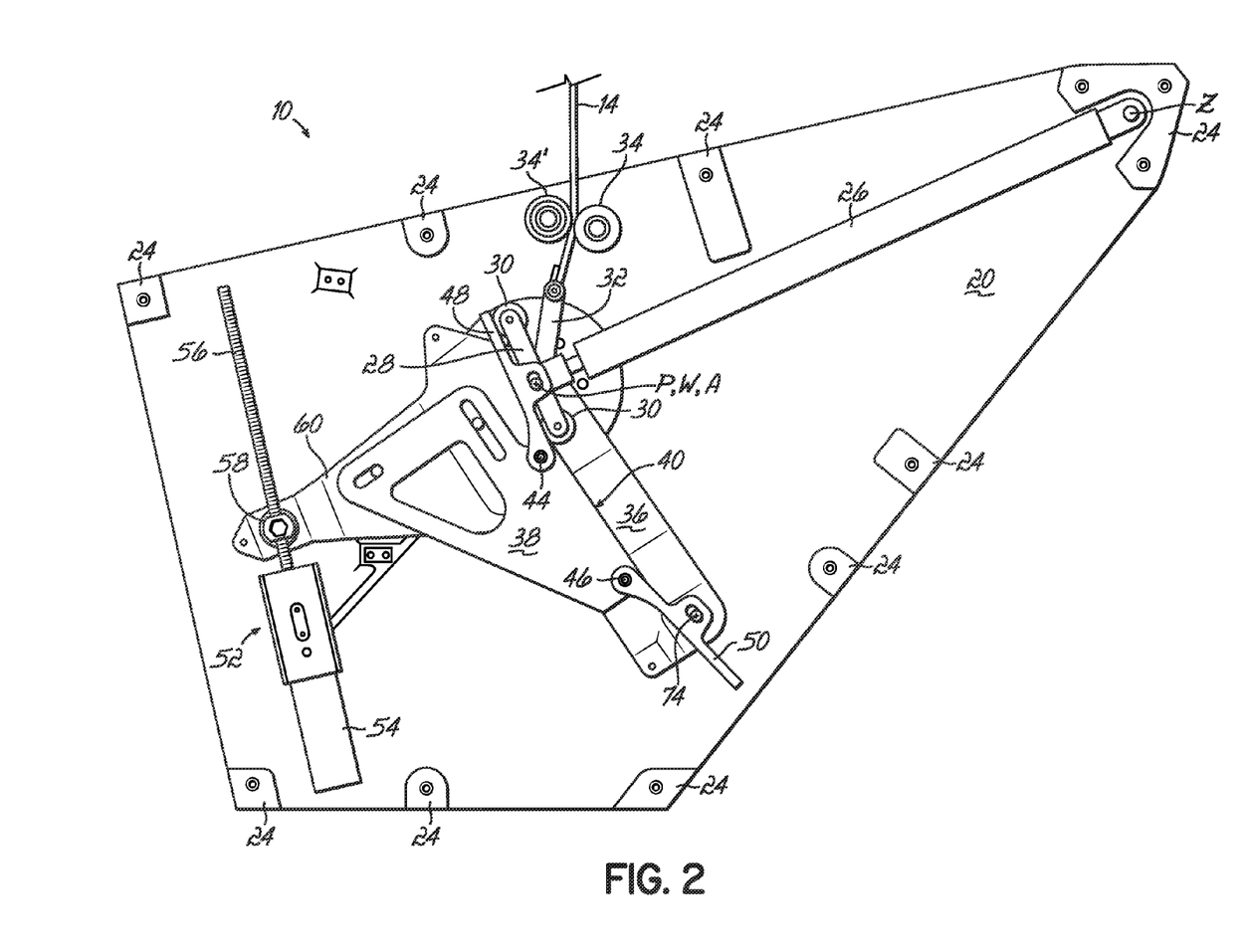

FIG. 2 shows the view II—II of FIG. 1 with cover plate 22 removed. A pneumatic pressure spring 26 serving as a spring system for generating an assistance force is coupled by its one end in the housing 18 (see FIG. 1) close to a corner thereof so as to be pivotable about an axis Z, which cuts the two cover plates 20, 22 at a right angle. The opposite, free end of the pneumatic pressure spring 26, at which its force is released, defines a force application point P for the assistance force. A slide 28 extending in FIG. 2 at right angles to the pneumatic pressure spring 26 is fastened to the force-releasing free end of the pneumatic pressure spring 26 in such a way as to be pivotable about an axis W, which is parallel to the axis Z and which contains the force application point P. At each of its two ends the slide 28 is provided with a roller 30. The cable 14 is fastened by means of a coupling element 32 to the slide 28. In said case, the coupling element 32 is attached in such a way to the slide 28 as to be rotatable about the axis W. The coupling element 32 and the cable 14, which extends guided by two guide pulleys 34, 34' out of the housing 18, together form the force-transmitting device.

Figure 6:
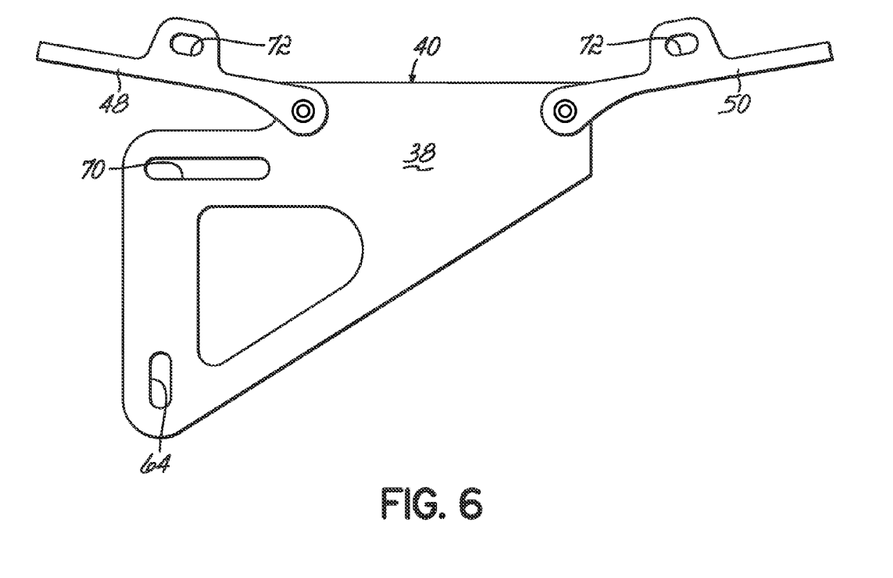

Mounted in the housing 18 of the force assistance module 10 is a support 36, which in the present case is plate-shaped and rotatable about the axis W. Disposed on the support 36 is a control plate 38, which is displaceable relative to the support 36 and is shown more precisely in FIGS. 6 and 7.

Figure 7:
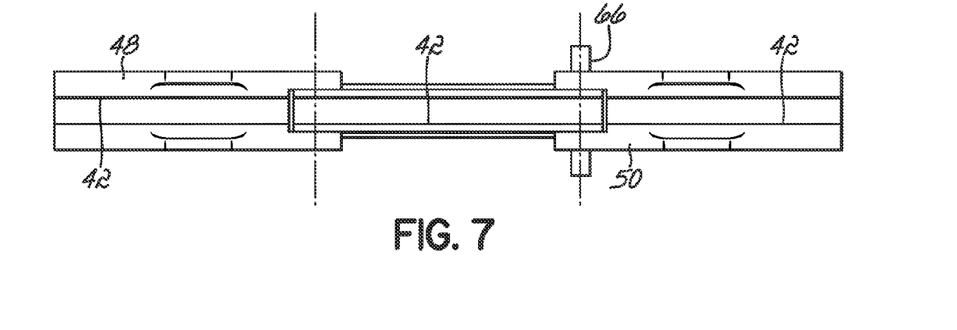

The narrow side of the control plate 38 facing the slide 28 forms a path 40, along which the slide 28 may roll back and forth between a first end point A and a second end point B. In the illustrated embodiment the path 40 comprises three sections. The middle section of the path 40 is formed by the narrow side of the central part of the control plate 38, which faces the slide 28 and into which a groove 42 is worked, which may receive and guide the rollers 30 of the slide 28. The two end sections of the path 40 are formed by levers 48 and 50, which are connected in an articulated manner to the control plate 38 at 44 and 46 respectively (see in particular FIGS. 6 and 7). The groove 42 continues along the surfaces of the levers 48 and 50 facing the slide 28 (FIG. 7).

For rotating the support 36 about the axis W there is provided in the housing 18 of the force assistance module 10 an adjusting device 52, the central components of which are an electric motor 54 and a spindle 56, which may be set in rotation by the electric motor 54. The spindle 56 interacts with a spindle nut 58, which is provided on an arm 60 of the support 36 in such a way that it may rotate about an axis parallel to the axis W. The spindle 56 and the spindle nut 58 together form a spindle drive. Rotation of the spindle 56 leads, depending on the direction of rotation, to an outward or inward screwing of the spindle nut 58 and hence to a rotating of the support 36 about the axis W.

There now follows a detailed functional description of the force assistance module 10. FIG. 2 reproduces a starting position, in which the force application point P is situated at the first end point A of the path 40. The support 36 occupies the non-rotated position shown in FIG. 2. The state reproduced in FIG. 2 corresponds to an unloaded and open state of the overhead luggage compartment 12. In this open position, the force application point P and the first end point A lie on the axis of rotation W of the support 36 and the slide 28. A non-illustrated force sensor detects in the open position the difference between the force due to weight of the luggage compartment 12 and the assistance force of the force assistance module 10 and passes a corresponding control signal via a control device (not shown) to the adjusting device 52. If the overhead luggage compartment 12 is empty, no rotating of the support 36 out of the position illustrated in FIG. 2 occurs.

When the empty overhead luggage compartment 12 is closed, the slide 28 rolls along the path 40 from the first end point A to the second end point B (see FIG. 3), which corresponds with a closed position of the overhead luggage compartment 12. During the closing operation a force assisting the closing operation is effective, which corresponds to the component of force of the pneumatic pressure spring that acts in the direction of the cable 14. Because of the path 40 being in the shape of a sector of an annulus, as shown in FIGS. 2 and 3, this assistance force remains approximately constant throughout the travel from the first end point A to the second end point B.

Figure 4:
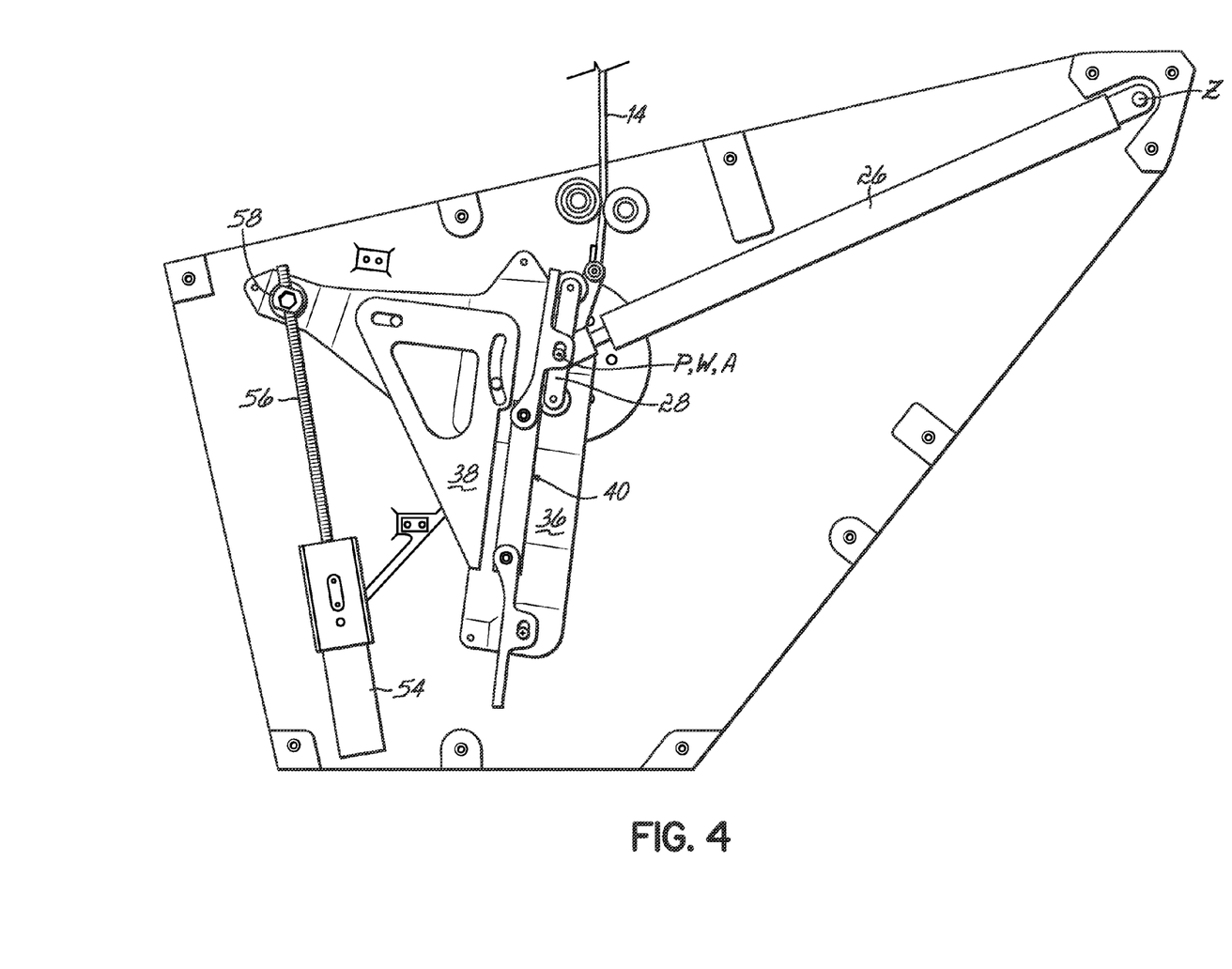

If, on the other hand, in the open position the force sensor detects that the overhead luggage compartment 12 is loaded, then while still in the open position the adjusting device 52 effects a rotating of the support 36 in clockwise direction in accordance with the detected loaded state of the luggage compartment 12. FIG. 4 shows a state such as arises when the luggage compartment 12 is open and fully loaded. In this state, the spindle nut 58 has been almost fully screwed out, with the result that the support 36 has been rotated through the maximum possible angle.

Figure 5:
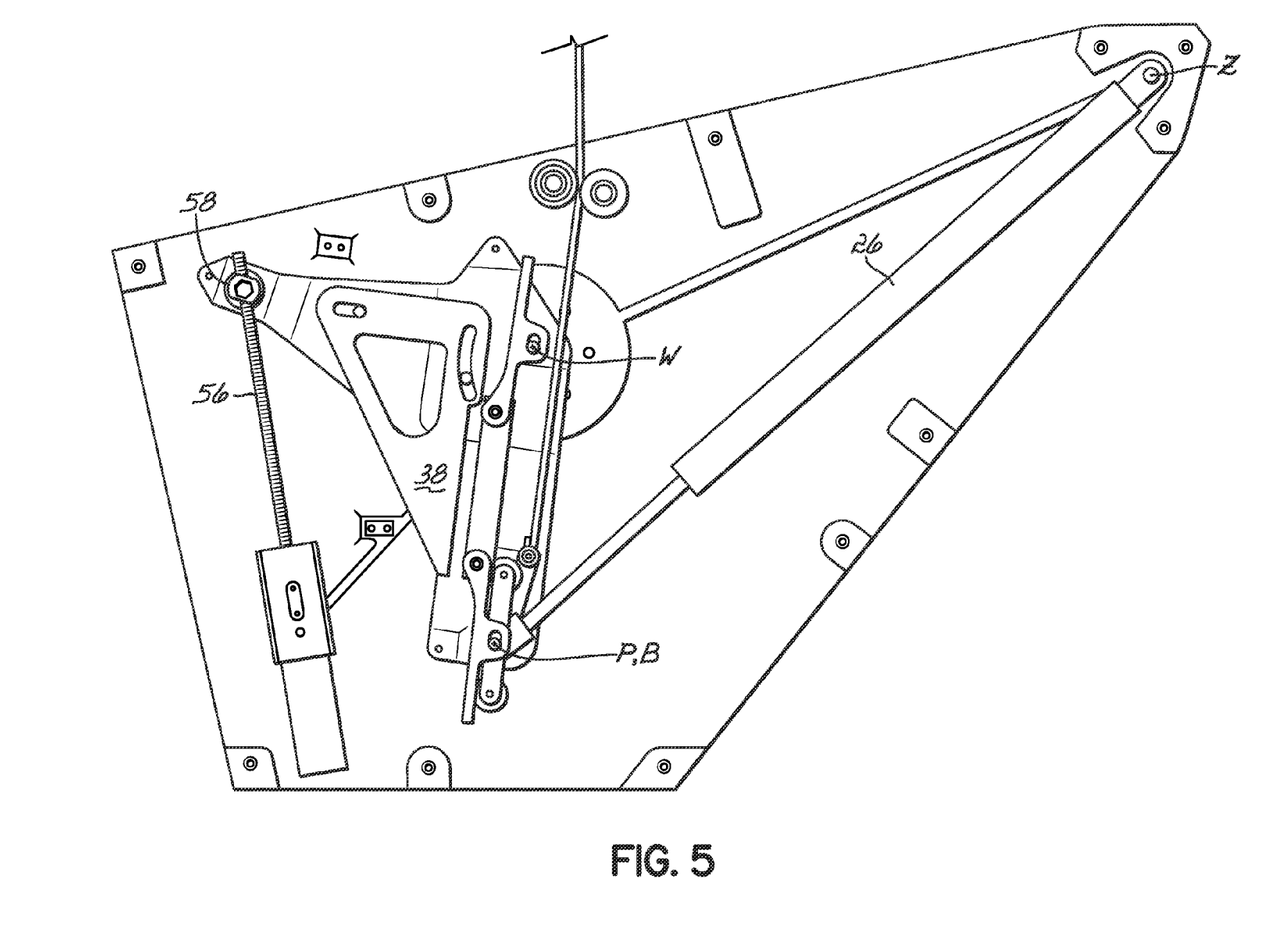

As is evident from FIG. 4, the rotating of the support 36 leads to a reduction of the angle between the force application direction of the force exerted by the pneumatic pressure spring 26 at the force application point P and the cable 14. This leads to a corresponding increase of the component of force of the pneumatic pressure spring acting in cable direction, in other words to a corresponding increase of the assistance force transmitted during the subsequent closing operation by means of the cable 14 to the luggage compartment 12. The luggage compartment 12, despite being loaded, is therefore closable by a user using the same force as is needed to close an empty luggage compartment 12. The closed, fully loaded state is shown in FIG. 5, the force application point P being situated at the second end point B of the path 40 (see FIG. 3). Because of the path 40 being in the shape of a sector of an annulus, the force assistance does not alter during the closing operation.

Figure 3:
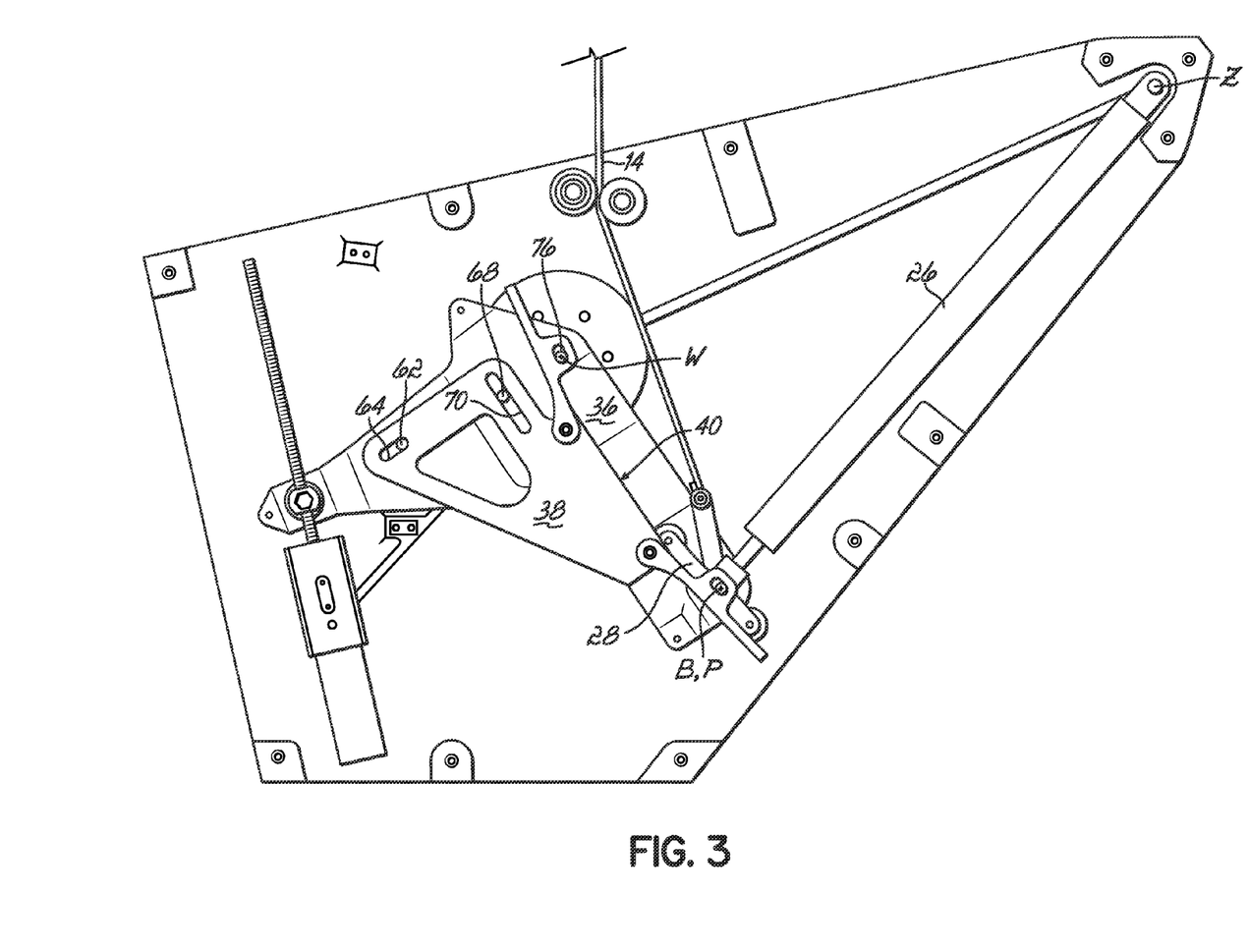

By means of the adjusting device 52 it is possible to achieve any rotated position of the support 36 lying between the non-rotated position according to FIGS. 2 and 3 and the maximum rotated position according to FIGS. 4 and 5. The assistance force acting upon the luggage compartment 12 is therefore infinitely adaptable to the loaded state.

It should be pointed out at this stage that the rotating of the support 36 is effected only in the open position, in which the force application point P is situated at the first end point A of the path 40. Because, in the presently illustrated embodiment, in the open position the force application point P and the first end point A lie on the axis of rotation W of the support 36 and the slide 28, a rotating of the support 36 does not lead to any compression or extension of the pneumatic pressure spring 26, for which reason the rotating of the support 36 requires only a low expenditure of energy.

In the functional description above, it was first assumed that the shape of the path 40 does not alter. It is however alternatively possible to alter the shape of the path 40 as a function of the angle of rotation of the support 36. To achieve this, the control plate 38 is guided on the support 36 in a restricted manner in that, on the one hand, a pin 62 fastened on an arm 60 of the support 36 projects into a gate 64 of the control plate 38 and a pin 66 of the lever 50 (see FIG. 7) projects into a corresponding gate (not visible in the drawing) of the support 36 and, on the other hand, a housing-fixed pin 68 projects through the support 36 into a further gate 70 of the control plate 38. Because of this arrangement, a rotating of the support 36 out of the starting position according to FIG. 2 leads to a displacement of the control plate 38 relative to the support 36 in the sense of a straightening of the path 40. For this purpose, the two levers 48 and 50 are each provided with an oblong hole 72 (see FIG. 6), into which, in the case of the lever 50, a guide projection 74 fastened on the support 36 projects (see FIG. 2). In the case of the lever 48, a pin 76 fastened to each of the housing halves 20 and 22 (see FIG. 3) projects into the oblong hole 72. The levers 48, 50 may therefore follow the relative displacement of the control plate 38 occurring in the direction of the slide 28, with the result that the path 40 becomes progressively rectilinear until, at the maximum rotation angle of the support 36, it is a straight line. FIGS. 4 and 5 show this state.

The straighter the path 40, the more the assistance force acting upon the cable 14 varies during a displacement of the force application point P from the first end point A to the second end point B, because in the course of this displacement the angle between the cable 14 and the force application direction at the force application point P becomes progressively smaller. The assistance force acting upon the luggage compartment 12 accordingly increases with proximity to the closed position and may be selected in such a way that it overcompensates the force due to weight of the luggage compartment 12 shortly before attainment of the closed position, with the result that the luggage compartment 12 closes automatically.

The invention claimed is:

1. Force assistance module (10) for providing a load-dependent assistance force, in particular for a lowerable overhead luggage compartment in an aircraft, comprising
a housing (18),
a spring system for generating the assistance force, of which spring system one end is coupled pivotally about an axis (Z) in the housing (18) and the other, opposite end defines a force application point (P),
a force-transmitting device fastened to or in the vicinity of the force application point (P) for transmitting assistance force to a location remote from the force assistance module,
a support (36), which is mounted rotatably in the housing (18) and on which a path (40) is provided, along which the force application point (P) is displaceable back and forth between a first end point (A) and a second end point (B), and
an adjusting device (52), which interacts with the support (36) and a load sensor and which as a function of the load detected by the load sensor rotates the support (36) in order to vary the angle between the force application direction of the assistance force at the force application point (P) and the force-transmitting device and hence adapt the value of the assistance force acting upon the force-transmitting device to the detected load.

2. Force assistance module according to claim 1, characterized in that the spring system is a pneumatic pressure spring (26).

3. Force assistance module according to claim 1, characterized in that a slide (28) is connected to the force-releasing end of the spring system, to which the force-transmitting device is fastened, and that the slide (28) is displaceable back and forth along the path (40).

4. Force assistance module according to claim 3, characterized in that the slide (28) rolls along the path (40).

5. Force assistance module according to claim 1, characterized in that the first end point (A) corresponds to an open position and the second end point (B) corresponds to a closed position.

6. Force assistance module according to claim 5, characterized in that a rotating of the support (36) by means of the adjusting device (52) is effected only when the force application point (P) is situated at the first end point (A).

7. Force assistance module according to claim 6, characterized in that the force application point (P) and the first end point (A) lie on the axis of rotation (W) of the support (36).

8. Force assistance module according to claim 1, characterized in that the path (40) is part of a circular path.

9. Force assistance module according to claim 1, characterized in that the shape of the path (40) alters as a function of the rotating of the support (36).

10. Force assistance module according to claim 9, characterized in that the path (40) comprises a plurality of sections connected in an articulated manner to one another, and that a control plate (38), which is displaceable relative to the support (36) and connected to the sections, varies the position of the individual sections relative to one another as a function of the rotating of the support (36).

11. Force assistance module according to claim 10, characterized in that the control plate (38) is guided in a restricted manner on the support (36).

12. Force assistance module according to claim 10, characterized in that the control plate (38) forms a section of the path (40).

13. Force assistance module according to claim 9, characterized in that the shape of the path (40), given no load or low load, is the shape of a sector of an annulus and, with increasing load, becomes progressively more rectilinear.

14. Force assistance module according to claim 1, characterized in that the adjusting device (52) comprises a spindle drive, which through rotation of its spindle (56) rotates the support (36) back and forth.

15. Force assistance module according to claim 14, characterized in that the spindle (56) is set in rotation by an electric motor (54).

16. Force assistance module according to claim 15, characterized in that the electric motor (54) is a stepping motor.

17. Force assistance module according to claim 1, characterized in that the force-transmitting device is a cable (14).

18. Force assistance module according to claim 1, characterized in that the value of the assistance force acting upon the force-transmitting device remains constant during a displacement of the force application point (P) between the first end point (A) and the second end point (B).

19. Force assistance module according to claim 1, characterized in that the value of the assistance force acting upon the force-transmitting device increases during a displacement of the force application point (P) from the first end point (A) to the second end point (B).

20. Force assistance module according to claim 19, characterized in that shortly before attainment of the second end point (B) the value of the assistance force acting upon the force-transmitting device corresponds to or slightly exceeds the detected load.

21. Force assistance module according to claim 1, characterized in that the housing (18) comprises two cover plates (20, 22), which are held at a distance from one another and between which the spring system, the rotatable support (36) and the adjusting device (52) are disposed.

22. The force assistance module according to claim 1 further comprising:
    the force application point (P) also located in the housing (18), and
    the housing (18) located behind a back wall which defines the overhead luggage compartment of an aircraft.

23. The force assistance module according to claim 1 further comprising:
    the force-transmitting device transmits assistance to a centrally located portion of the top wall of the luggage compartment.

* * * * *